Dec. 28, 1965
J. S. HAWKES
3,225,811
TIRE WITH RUN-FLAT WARNING DEVICE
Filed April 27, 1964
2 Sheets-Sheet 1
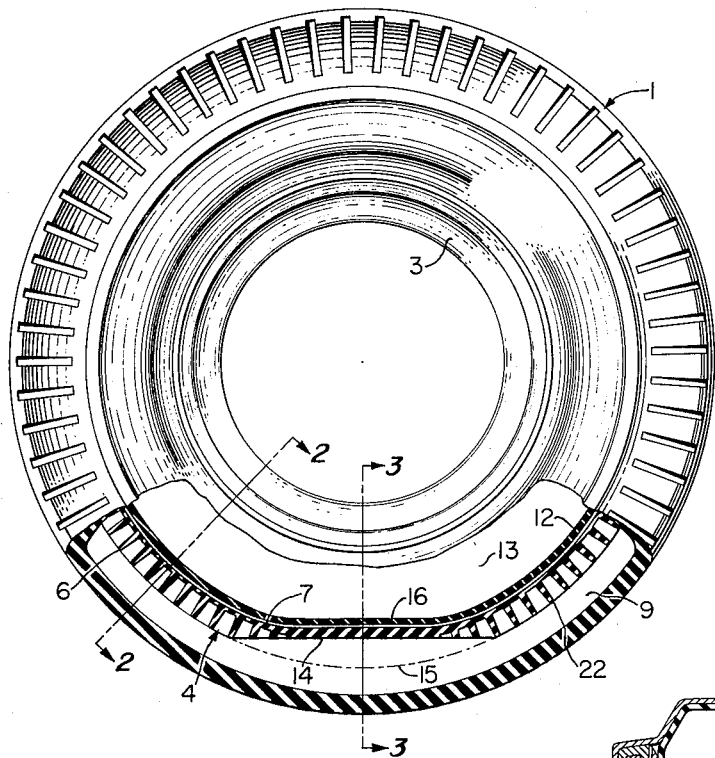
FIG. 1
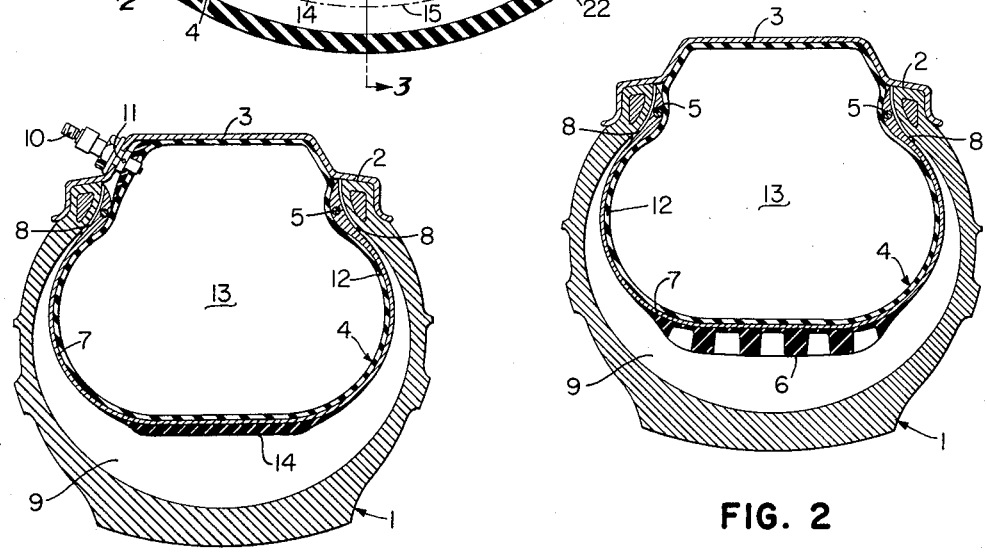
FIG. 2
FIG. 3
INVENTOR.
JOSEPH S. HAWKES
BY
J. B. Holden
ATTORNEY

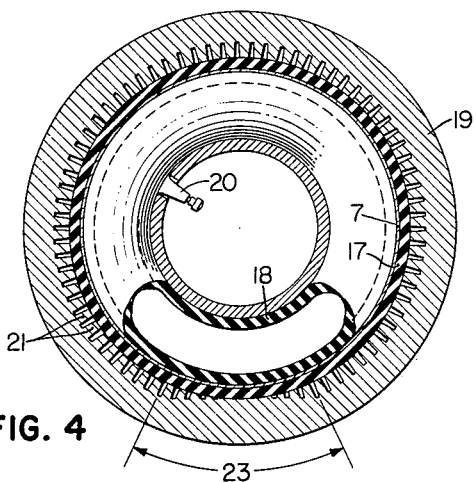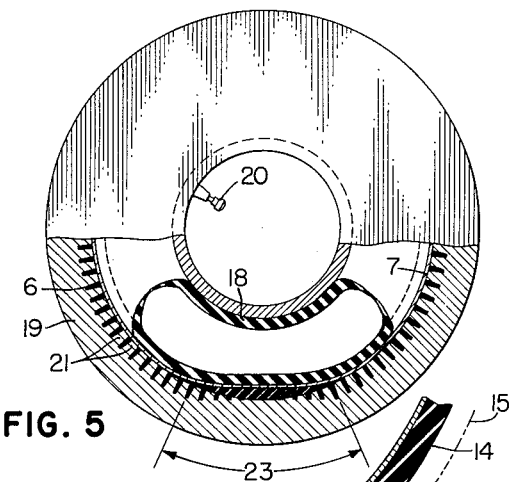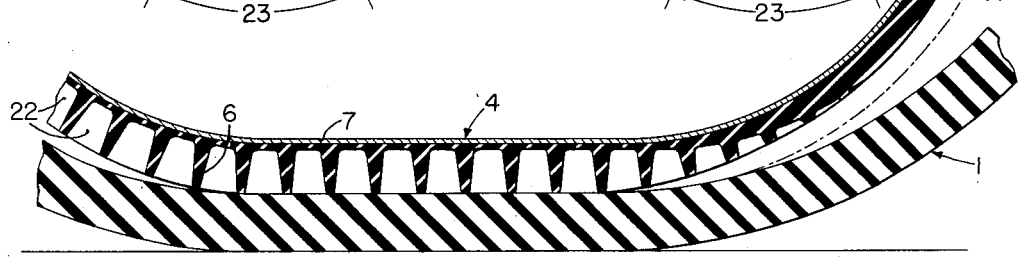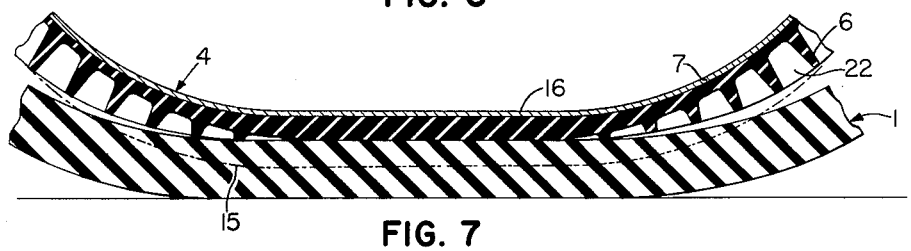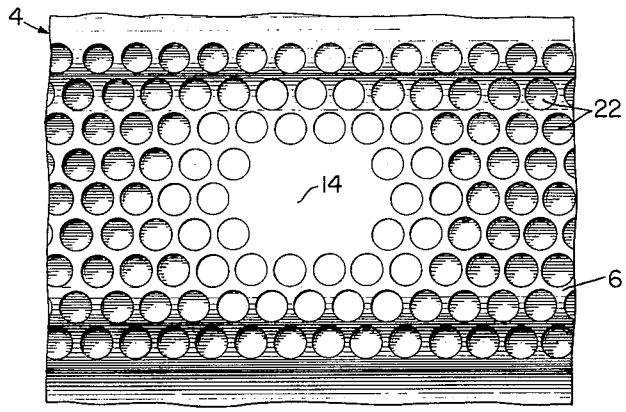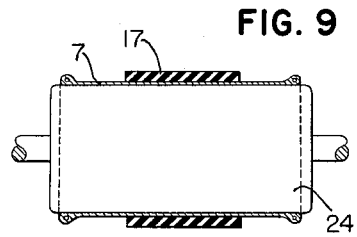
INVENTOR.
JOSEPH S. HAWKES

# United States Patent Office 3,225,811
Patented Dec. 28, 1965

3,225,811
TIRE WITH RUN-FLAT WARNING DEVICE
Joseph S. Hawkes, Cuyahoga Falls, Ohio, assignor to The Goodyear Tire & Rubber Company, Akron, Ohio, a corporation of Ohio
Filed Apr. 27, 1964, Ser. No. 362,724
4 Claims. (Cl. 152—340)

The present invention relates to safety tires of the type in which there is the usual outer tire having the space defined by the tire and rim on which it is mounted divided into radially disposed inner and outer chambers by a circumferentially extending wall which acts as an emergency tire when the outer tire fails. Usually such a wall is so constructed as to permit continued operation of the vehicle until a service station is reached. In such a construction the dividing wall normally lies relatively close to the inner circumference of the outer tire but not close enough to be engaged by the outer tire in normal operation. Consequently, if the outer chamber becomes deflated as by a puncture or a blowout, there is very little lessening of the rolling radius of the tire, and the operator is likely not to know that the outer chamber has failed, since there is substantially no noticeable difference in operation of the vehicle to acquaint him with this fact. He may, therefore, continue to drive the vehicle for a sufficient length of time to destroy the inner dividing wall with obvious results. In short, the advantage of having a safety tire at all may be lost.

It is, therefore, an object of the present invention to provide means for warning the driver of the vehicle that the outer chamber has failed, by providing a flat spot on the wall whereby, after the outer chamber fails and the inner wall takes the load, there will be an irregularity in the operation which will cause a vibration to the wheel axle which is usually transmitted to the driver through the steering apparatus or car body so that he become aware that he has a flat tire and that he should proceed to the nearest service station to have a repair made and not continue driving for any great distance since this could cause failure of the dividing wall.

The invention, in the form shown in the drawings, contemplates the use of relatively rigid flat spot on the dividing wall which in this case is the outer circumference of an inner tire. The term "flat spot" as used herein means a minor area on the circumference of the inner tire which is of less radial extent than the maximum radius of the tire circumference, but this term is not limited to an area that is absolutely flat in the normal sense of that word. The circumferential area of the flat spot should be of a circumferential extent to cause the axle on which the tire carrying wheel is mounted to drop abruptly and thus cause a periodic vibration to the axle which in turn is transmitted to the operator by feel through the supporting and steering mechanism as well as by sound. Such a construction is shown broadly in U.S. Patent 3,085,615, but the construction shown in that patent requires special manufacturing techniques that must be carefully observed in the buildup of the inner tire to insure the optimum vibration. This invention provides an inexpensive method of manufacture while insuring the optimum desired vibration under emergency conditions. The construction also protects the tire against puncturing by objects, such as nails, penetrating the outer tire and projecting inwardly of the inner circumference thereof, while maintaining substantial dynamic and static balance.

Other objects and advantages of this invention will become apparent hereinafter as the description thereof proceeds, the novel features, arrangements and combinations being clearly pointed out in the specification as well as the claims thereunto appended.

In the drawings, FIGURE 1 is an elevation of the sidewall of a tire, partly in section;

FIGURE 2 is a cross-section taken along the line 2—2 of FIGURE 1;

FIGURE 3 is a cross-section taken along the line 3—3 of FIGURE 1;

FIGURES 4 and 5 show two steps in the manufacture of the inner tire tread;

FIGURES 6 and 7 illustrate the operation of the invention under emergency conditions;

FIGURE 8 is a plan view of the flat spot on the tread of the inner tire, and

FIGURE 9 shows a building step.

In FIGS. 1, 2 and 3 an outer tubeless tire 1 is mounted on the rim seats 2 of a rim 3 in the usual manner. An inner tire 4 mounted within the outer tire has beads 5 to restrain the movement of the inner tire radially and is provided at its outer circumference with a tread 6 formed on the outer surface of a substantially inextensible tire carcass 7 so that under emergency conditions the inner tire will not expand. Circumferentially spaced, radially extending grooves 8 at the outer wall of the carcass 7 at the bead areas 5 provide passages for air supplied to the outer chamber 9 from a valve 10 through a lateral port 11 in the valve. An inner tube 12 forming the inner chamber 13 is arranged within the tire 4 and is supplied with air from the valve 10 through a port at the radial inner end of the valve. The valve 10 is preferably designed to supply air to the chambers 9 and 13 at rates such that the pressure in the inner chamber 13 is always higher than in the outer chamber 9, to hold the beads 5 of the tire 4 firmly against the inner walls of tire 1 during normal operation as well as under emergency conditions. There is no communication between chambers 9 and 13 after inflation of the chambers. When the outer tire fails the tread 6 of the inner tire rides on the inner circumferential surface of the outer tire.

It is obvious that if the tread 6 is provided with a low spot as at 14, here shown as flat, the wheel and axle will drop periodically during emergency operation and cause vibration of the axle that supports the tire and wheel and this, in turn, results in a vibration sensible to the operator, generally through the steering apparatus, to let him know that he has a flat tire and should proceed to the nearest service area where a repair or change can be made even though the inner tire is constructed to permit continued operation of the vehicle for a substantial period of time after outer tire failure. Notice that in FIG. 1 there is a substantial radial distance between the center of the flat spot 14 and the dotted line 15 representing the outermost circumference of the tread 6 extended. Note in FIG. 1 that the carcass 7 is flattened in the area 16 resulting from the molding operation and in normal use this flattened area is not materially changed because of the opposed pressures in the two air chambers. However, under emergency conditions, with only the inner chamber inflated, the carcass in this area may tend to become slightly arcuate in shape circumferentially but is restrained from becoming fully rounded out by the relatively thick layer of tread rubber covering this area.

Even though the carcass may approach its normal fully rounded shape a drop in rolling radius is created by the absence of any tread design depth in the center of the flat spot.

The molding of the tread 6 on the tire carcass 7 is best illustrated in FIGS. 4 and 5. The carcass 7 is formed in any well known manner to produce a relatively non-extensible carcass of uniform cross-section throughout such as by employing layers of cord fabric extending between the beads of the tire and laid at opposite angles to each other. A relatively heavy layer of unvulcanized tread rubber 17 of uniform thickness is then applied to the outer circumference of the carcass 7 as shown in FIG. 4. An air bag 18 (or bladder) is placed in the carcass and then the tire and air bag are inserted in the mold 19 in a manner well understood in the art. A valve 20 on the air bag 18 is used to supply the pressure medium to the inside thereof to force the tire carcass 7 outwardly toward the walls of the mold.

Throughout the major portion of the circumferential tread forming portion of the mold are radially inwardly extending pins 21 of substantially uniform length, the inner ends of which all terminate at substantially the same radial distance from the center of the mold. As best illustrated in FIG. 8 these form a tread having enlarged closely spaced openings 22 separated by relatively thin flexible walls when the tread is fully molded as in FIG. 5. This tread holds the carcass of the outer tire 1 away from the inner surface of the tire carcass 7 sufficiently to prevent nails or other puncturing objects that extend through the outer tire, no deeper than the tread, engaging the carcass of the inner tire and thus prevent failure of the inner tire under emergency use.

In the circumferential area of the tread designated as the distance 23 in FIGS. 4 and 5 and represented by the plan view of the tread area in FIG. 8, the lengths of the pins 21 become shorter the greater the distance such pins are from the edges of the flat area on the tire as can be seen in FIGS. 4, 5 and 8. In fact, as shown in the drawings, there are no openings at the center of the flat spot and near the edges of the flat spot the depth of the openings are substantially the same as in the major portion of the tread.

The circumferential extent of the flat area on the tread should preferably be in the order of 30° to 50° of the tread circumference (usually about 40°), the circumferential extent of this flattened area being one factor in determining the amount of vibration transmitted to the wheel axle. The circumferential extent of the flat area should be such as to give a moderate warning to the driver without providing so much vibration as to cause concern as to the advisability of continuing operation of the vehicle.

In FIG. 5 note that when the tire is molded under heat and pressure the rubber flows radially into the adjacent spaces between the pins 21 forming a deep tread except in the area 23 in which the shallower depth of the spaces between the shorter pins restrict the radial outward flow of the rubber. As a result the overall thickness of the flat spot gradually increases from the center where the tread thickness is substantially equal to the original thickness of the rubber layer to a tread thickness at the edges of the flat spot equal to the maximum tread thickness. The pins 21 restrict circumferential flow of the rubber and, as a result, the rubber weight-wise, is distributed uniformly throughout the circumference of the tire to insure a substantial static and dynamic balance for the inner tire. At the same time the flat spot is quite rigid due to the greater density of the rubber in the flat spot. As a result, under emergency conditions, the downward movement of the wheel axle is arrested rather abruptly to cause vibration of the wheel. A relatively thin carcass having little if any tread thereon would not give as much vibration.

As will be apparent from the description the arrangement of the pins results in a flat area of varying overall thickness, but it is obvious that if desired the flat spot of the tire could be of uniform thickness throughout, in which case it would not be necessary to provide any perforations in the flat area. This would, however, provide an abrupt change in the tread thickness at the edges of the flat spot.

FIG. 6 shows the position of the thicker tread portion of the inner tire 7 in engagement with the inner wall of the outer tire 1 under emergency operation. The relatively thin walls between the openings 22 in the tread will deflect somewhat to compensate for the relative movement between the two tires during emergency operation without causing as much abrasion as would result if the tread walls were relatively rigid or inflexible laterally.

In FIG. 7 the flat spot is shown in engagement with the outer tire and the distance between the dotted line 15 and the flat spot 14 in FIG. 1 determines the amount the wheel axle drops when the flat spot moves into position adjacent the roadway during emergency operation.

While the tread contour including the depth of the holes could be manufactured by other methods, the method shown herein is very simple and not only accomplishes the shaping of the tread as desired but also preserves the balance of the tire at least to such an extent that later there is very little, if any, balancing required.

FIG. 8 shows a plan view of the tread and it is to be noted that the central area in this case is not perforated at all, although the necessity of having an unperforated center area is not critical.

As an example, a safety inner tire for use with an 800 x 14 tire has a normal tread thickness, other than in the flat spot area, of about ½″, whereas in the flat spot area the thickness at the center thereof is about ¼″ and varies from ¼″ to ½″ from the center of the area to the edges thereof.

Normally the clearance between the inner circumference of the outer tire and the major portion of the outer circumference of the inner tire is about 1¼″ for the same 800 x 14 tire mentioned above, but this is without load on the tire. Under load the deflection of the tire at the road-contacting area reduces this clearance to about ¼″. When the outer tire fails, the inner tire contacts the outer tire after a drop of about ¼″, but then the load is transferred to the inner tire which then flattens out in the road-contacting area so that the total drop of the wheel amounts to about 1″ from normal operation with the outer tire inflated. Such a drop would not normally be noticed by the operator while operating the vehicle but with the flat spot on the tread of the inner tire the vibration advises the operator that there is an outer tire failure and that he should have it fixed or replaced as soon as possible.

While the tread may be applied to the carcass after it is expanded to an annulus of inverted U-shape in cross-section, in practice it is applied as shown in FIG. 9 in which the carcass 7 is first formed as a flat annular band on a tire building drum 24 and then a layer of rubber of uniform cross-section and density is formed at the median circumferential surface of the band and then the band is expanded into an annulus of inverted U-shape cross-section either in the mold or preliminary to inserting same in the mold.

While certain representative embodiments and details have been shown for the purpose of illustrating the invention, it will be apparent to those skilled in the art that various changes and modifications may be made therein without departing from the spirit or scope of the invention.

I claim:

1. In the combination of an outer tire mounted on a rim and an annular safety wall dividing the space between said rim and tire into radially disposed inner and outer chambers with means for inflating said chambers, that improvement in the safety wall which comprises making said safety wall of substantially uniform cross-section and radial extent at its outer circumference and providing a rubber tread on said outer circumference having a major circumferential portion appreciably less than 360° of the circumference of said wall and a circumferentially adjacent minor portion of lesser radial thickness than said major portion thus forming an area at the outer circumference of said tread of less radial extent than said adjacent major portion, the rubber in said tread being substantially uniformly distributed throughout the major and minor portions to provide for substantially equal distribution of the weight of the rubber, the major portion having the rubber therein expanded to a greater thickness than the minor portion by the provision of numerous voids therein.

2. That improvement in the combination set forth in claim 1 in which the thickness of said minor portion from the center thereof to its edges adjacent the major portion is gradually increased by providing voids of increasing amounts in said minor portion from near the center thereof toward its edges.

3. That improvement in the combination set forth in claim 2 which comprises making the radial outer circumference of said minor tread portion substantially flat with the circumferential edges thereof substantially the thickness of the adjacent edges of said major tread portion.

4. That improvement in the combination set forth in claim 1 in which the minor portion extends circumferentially for a distance in the order of 40° of the circumference of the tread.

References Cited by the Examiner
UNITED STATES PATENTS

| | | | |
|---|---|---|---|
| 1,428,419 | 9/1922 | De Mattia | 156—128 |
| 2,290,624 | 7/1942 | Wait et al. | 156—128 |
| 3,085,615 | 4/1963 | Sanderson | 152—340 |

ARTHUR L. LA POINT, *Primary Examiner.*